US006067869A

United States Patent [19]

Chilla et al.

[11] Patent Number: 6,067,869

[45] Date of Patent: May 30, 2000

[54] ACTUATING ASSEMBLY FOR MOTOR-VEHICLE DOOR LATCH

[75] Inventors: Reinhold Chilla, Velbert; Hans Deischl, Jettingen; Thomas Heide, Essen; Klaus-Jürgen Heimbrodt, Löchgau; Dieter Heise; Rolf Knop, both of Velbert; Rudi Kölle, Sindelfingen; Simone Thiele née Fischer, Velbert, all of Germany

[73] Assignee: Kiekbert AG, Heiligenhaus, Germany

[21] Appl. No.: 09/221,252

[22] Filed: Dec. 28, 1998

[30] Foreign Application Priority Data

Dec. 30, 1997 [DE] Germany ........................... 197 58 078

[51] Int. Cl.$^{7}$ .............................. F16H 21/44; E05B 3/00; F16C 3/03

[52] U.S. Cl. ........................... 74/96; 292/336.3; 464/169; 74/543

[58] Field of Search .................... 74/96, 543; 292/336.3, 292/DIG. 31; 464/169

[56] References Cited

U.S. PATENT DOCUMENTS 5,725,262 3/1998 Kritzler ................................ 292/336.3

FOREIGN PATENT DOCUMENTS

| | | |
|---|---|---|
| 33 45 488 | 6/1984 | Germany . |
| 4319295 | 12/1993 | Germany . |
| 195 24 568 | 12/1996 | Germany . |
| 195 27 837 | 2/1997 | Germany . |
| 2296936 | 7/1996 | United Kingdom . |

*Primary Examiner*—Allan D. Herrmann
*Attorney, Agent, or Firm*—Herbert Dubno; Andrew Wilford

[57] ABSTRACT

A motor-vehicle door has a latch assembly having a door latch having a release lever displaceable to unlatch the door and a horizontally displaceable outside door handle. A transmission member rotatable about an axis is connected to the handle such that horizontal displacement of the handle rotates the transmission member about the axis. An actuating head is rotationally fixed to the transmission member and a shaft generally coaxial with the transmission member carries a formation axially fittable with the actuating head for rotationally coupling the transmission member to the shaft. A crank extending from the shaft is movable angularly about the axis on rotation of the shaft and a link is connected between the crank and the release lever so that when the handle is displaced horizontally the shaft is rotated about the axis, the crank and link are displaced and in turn displace the release lever, and the latch is operated. The head is formed with a noncircular axially open seat and the formation is complementarily fittable in the seat.

9 Claims, 4 Drawing Sheets

ACTUATING ASSEMBLY FOR MOTOR-VEHICLE DOOR LATCH

FIELD OF THE INVENTION

The present invention relates to a motor-vehicle door latch. More particularly this invention concerns an actuating assembly for such a latch.

BACKGROUND OF THE INVENTION

A motor-vehicle door latch has an outside release lever whose end is normally moved vertically to unlatch the vehicle door. The door handle, however, is typically movable horizontally so that a natural pull on the handle first unlatches the door and then pulls it open.

A standard actuating mechanism for such a door has a pivotal link lever connected to the handle and connected in turn via a vertical link rod to the latch-release lever. Thus the horizontal movement of the handle is converted into a vertical movement of the rod and of the free end of the latch-release lever.

With this known system in an accident the door is frequently popped open. This happens when a blow from the side into the door pushes in the door panel and the outside door handle, whose base plate is mounted in the door so that it pivots about a horizontal axis. This forcible rotation of the door handle raises the link rod so that the latch-release lever is lifted and the latch opened. The cause of this is that a pushing in of the door is effective to bend in and effectively shorten the link rod or the entire outside-handle mechanism is pivoted about a horizontal axis to raise the link-rod.

A motor-vehicle door latch is also known from German patent document 3,345,588 of J. Johnson (claiming priority of U.S. application 450,061 of Dec. 15, 1982) with a support element mounted on the door, a linearly movable actuating mechanism connected with the support element, and a release lever that is pivotal on the support element and that is set up to actuate the door latch. The mechanism has a linearly movable cam element with a spiral actuating formation and a release lever having a cam opening through which passes the cam element and which has a cross section corresponding to that of the cam element. Furthermore a mechanism is provided effectively connecting the cam element with the actuating device such that a linear movement of the cam element moves the cam element via the actuating mechanism linearly through the cam opening and moves the release lever to actuate the door latch. This known mechanism is difficult to assembly and has problems in that the linear movement of the cam element is produced by a spiral-shaped section in a cam opening. Thus substantial friction and wear must be allowed for so that the conversion of the handle movement into a pivotal movement of the release lever is normally unsatisfactory.

OBJECTS OF THE INVENTION

It is therefore an object of the present invention to provide an improved actuator for a motor-vehicle door latch.

Another object is the provision of such an improved actuator for a motor-vehicle door latch which overcomes the above-given disadvantages, that is which is of simple construction, which efficiently converts the linear horizontal movement of the door handle into a vertical movement of the latch-release lever, and which will not normally open in the event of a side collision.

SUMMARY OF THE INVENTION

A motor-vehicle door has a latch assembly having according to the invention a door latch having a release lever displaceable to unlatch the door and a horizontally displaceable outside door handle. A transmission member rotatable about an axis is connected to the handle such that horizontal displacement of the handle rotates the transmission member about the axis. An actuating head is rotationally fixed to the transmission member and a shaft generally coaxial with the transmission member carries a formation axially fittable with the actuating head for rotationally coupling the transmission member to the shaft. A crank extending from the shaft is movable angularly about the axis on rotation of the shaft and a link is connected between the crank and the release lever so that when the handle is displaced horizontally the shaft is rotated about the axis, the crank and link are displaced and in turn displace the release lever, and the latch is operated.

Thus according to the invention the horizontal movement of the handle is first converted into rotation and then into a normally vertical linear movement to operate the door latch. Thus if a side collision when the door is pushed in and the handle is turned, there is no likelihood of this action being effective through the linkage to open the door. The latch-actuating mechanism would have to be massively deformed before the appropriate pull or push on the link would be created, something that would only happen in such a severe accident that the likelihood of the door even staying on its hinges would be remote. The latch-actuating assembly according to the invention is therefore very safe.

According to a further feature of the invention the head is formed with a noncircular axially open seat and the formation is complementarily fittable in the seat. In addition a swivel joint is provided between the shaft and the crank. This allows the assembly to be put together fairly easily and compensates for misalignments or modest changes in spacing between the latch and the handle mechanism. This ease of assembly and accommodation for misalignment is further aided when according to the invention the second shaft has a pair of axially telescoping and rotationally coupled parts and a spring is braced between the shaft parts and urges the head axially toward the formation. Such a releasable connection not only makes initial installation very easy, but also eases subsequent servicing.

The crank is an eccentric disk in accordance with the invention and a second shaft generally coaxial with the first-mentioned shaft extends between and is secured to the actuating head and the transmission member. Furthermore the transmission member is an arm fixed on and extending radially from the second shaft and a counterweight is mounted on the second shaft diametrally opposite the transmission member. This transmission-member arm is formed as a fork and the handle has a coupling formation engaged in the fork.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
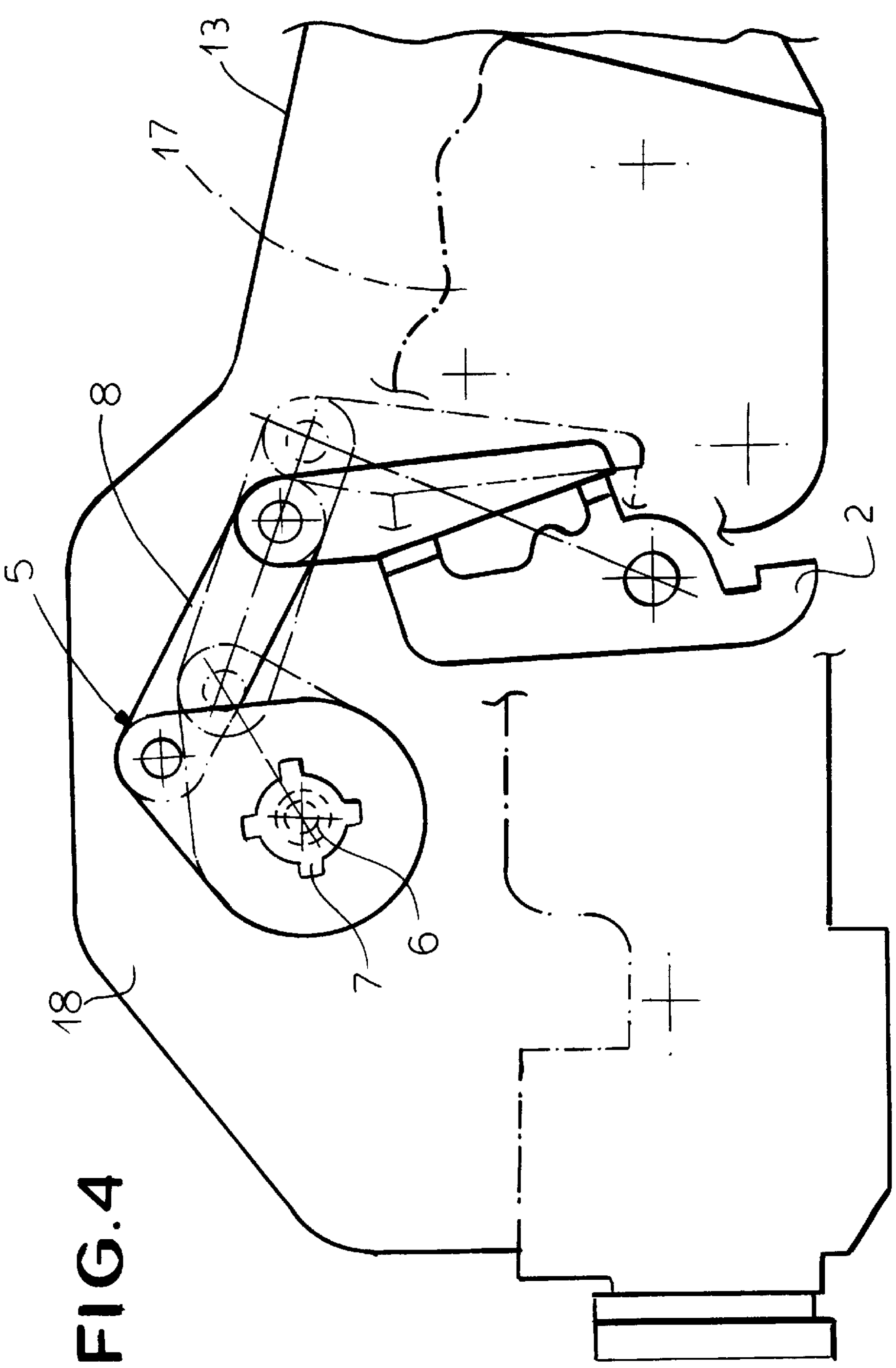
FIG. 4 is a view taken in the direction of arrow IV of FIG. 3.

As seen in the drawing, a motor-vehicle door latch has a handle 1 that is normally pivoted to move an L-shaped actuating member 15 at one end in a horizontal direction to actuate a door latch whose outline is shown at 17 in FIG. 4. This latch 17 has an actuating or release lever 2 that must be pivoted to unlatch a door 18 carrying a base plate 13 in turn carrying the handle 1. The direction in which the end of the release lever 2 must move is normally vertical and not parallel to the horizontal direction of movement of the handle 1.

Figure 1:
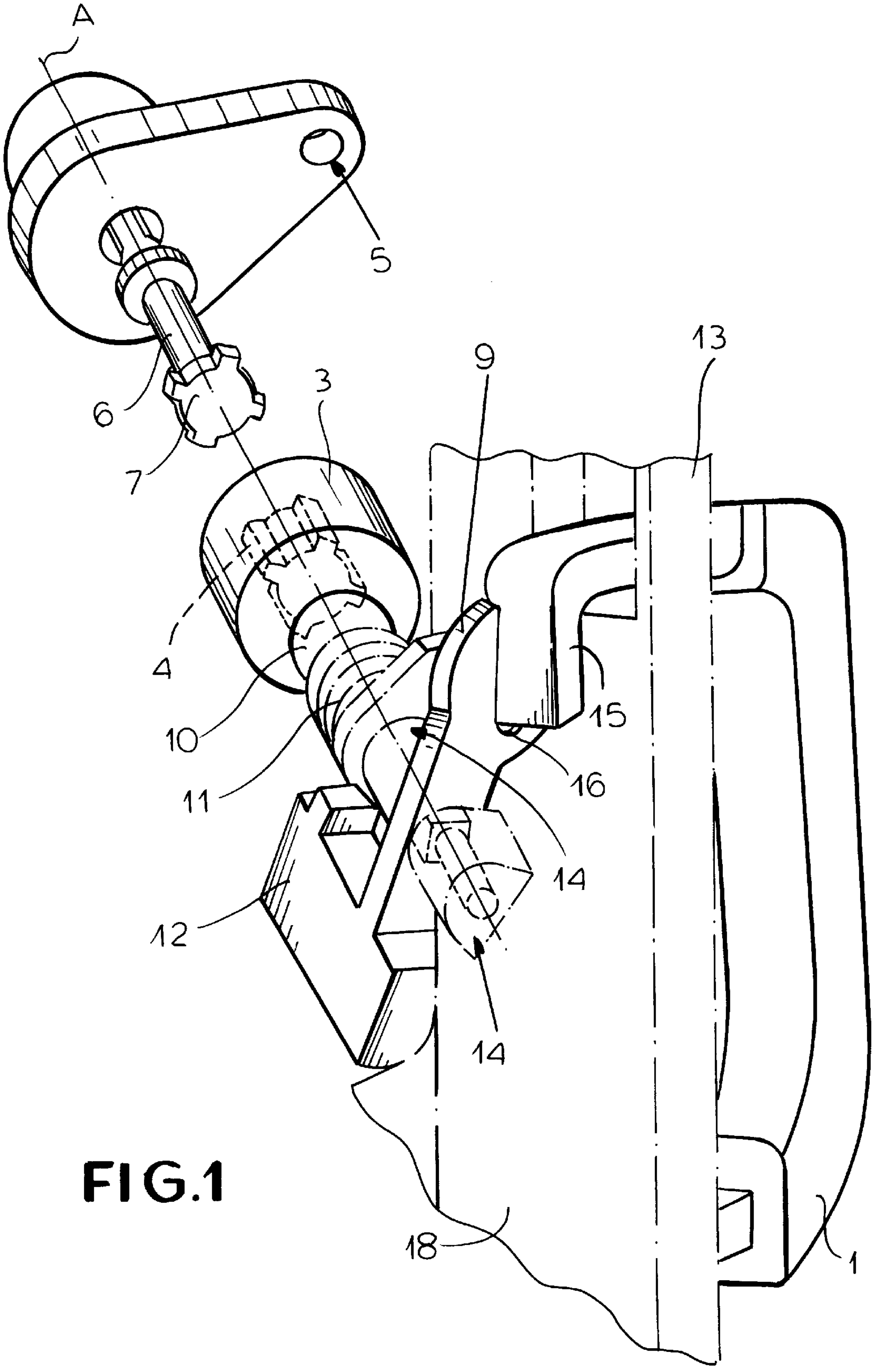
FIGS. 1 and 2 are partly schematic perspective views of the actuating assembly in the rest and actuated positions, respectively.
Figure 2:
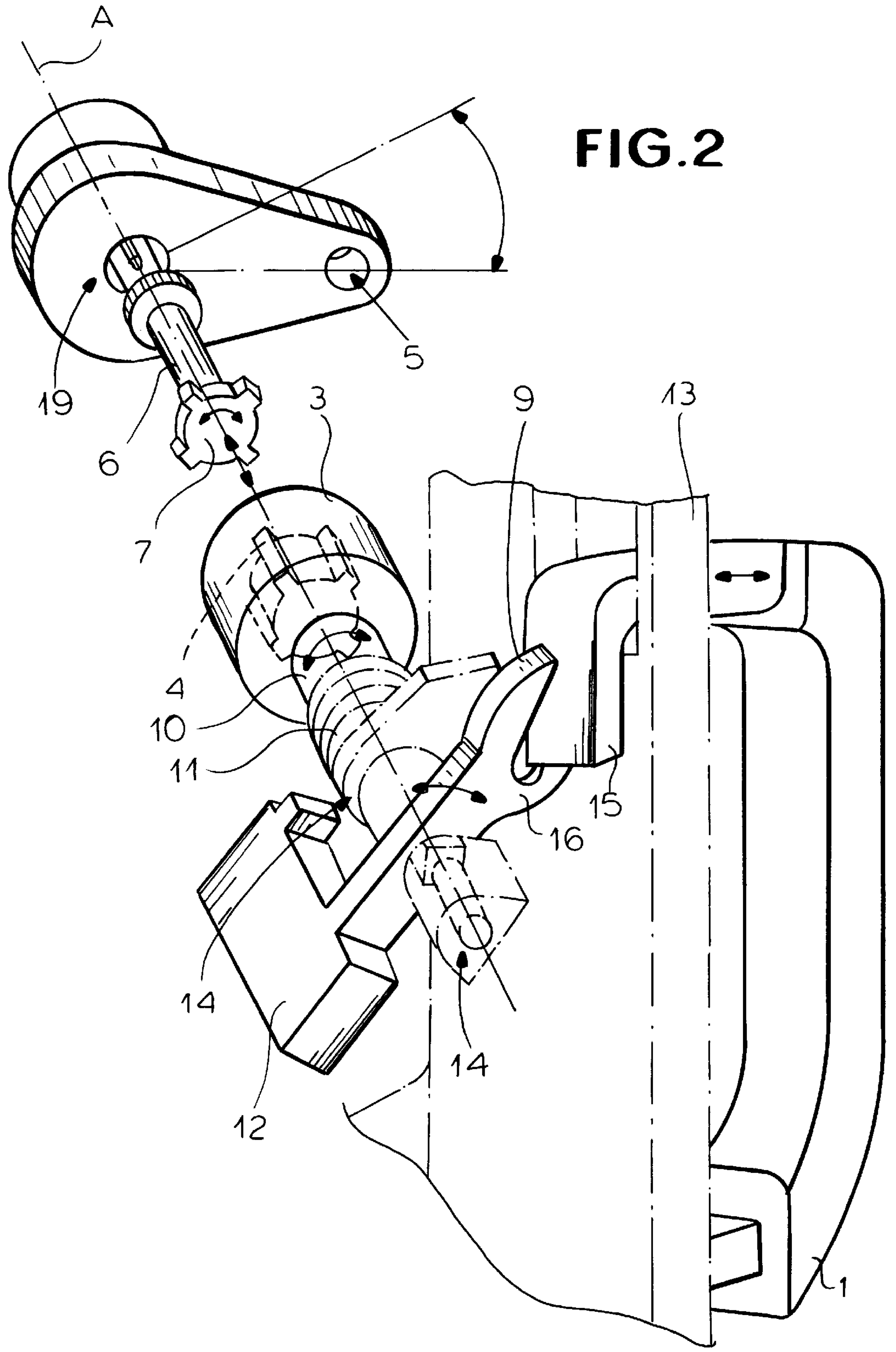
Figure 3:
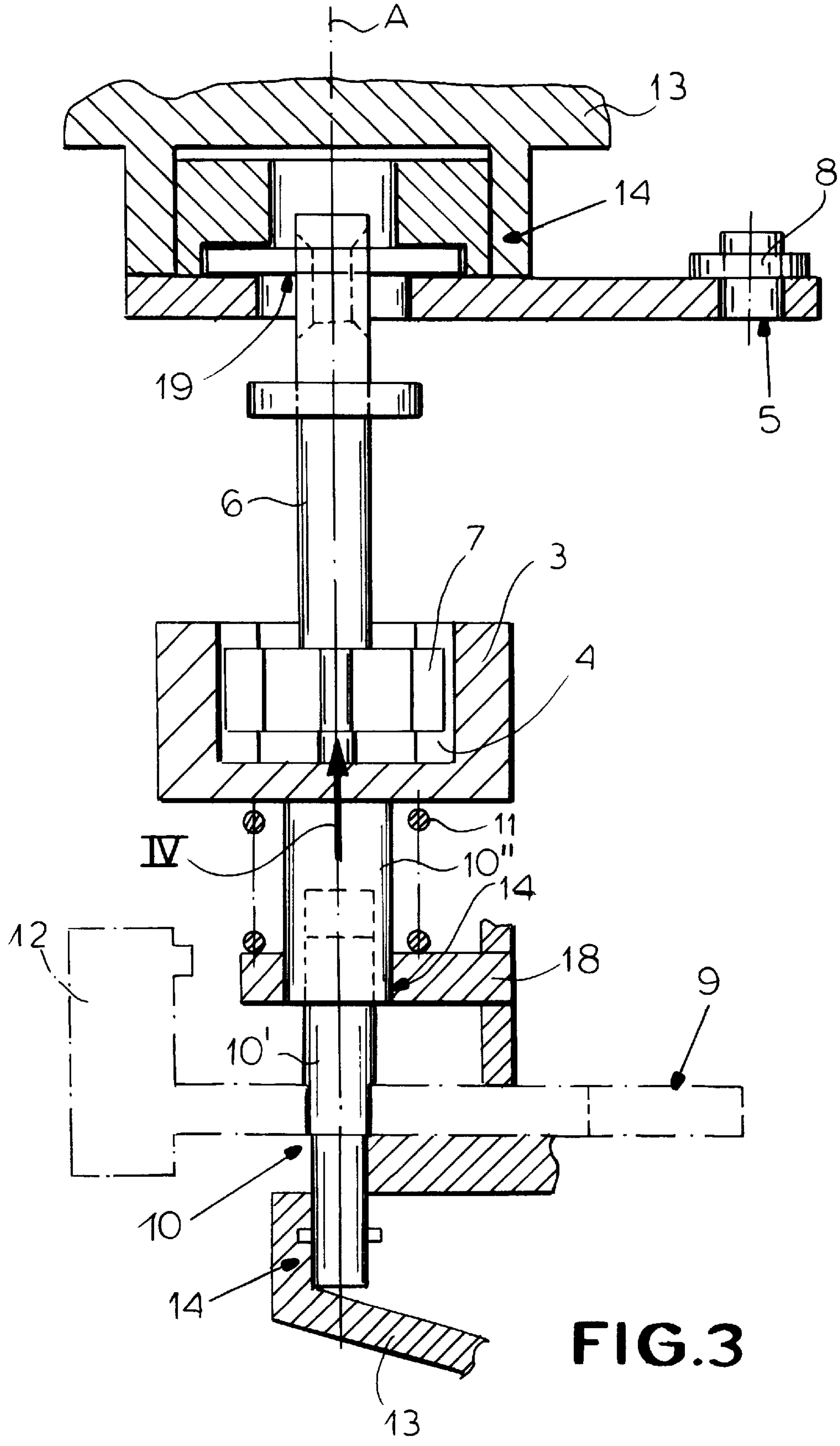
FIG. 3 is an axial section through the assembly.

The actuating member 15 of the handle 1 engages in a mouth 16 of an actuating fork 9 fixed on a shaft 10 journaled at 14 on the mounting plate 13 for rotation about an axis A that can be vertical, horizontal, or skew. The opposite end of this lever or fork 9 carries a counterweight 12 set so that up-and-down or side-to-side movements of a vehicle provided with the door 18 will not cause the handle 1 to move and pivot the shaft 10 which extends along a normally vertical axis A. The shaft 10 is made of two axially telescoping parts 10' and 10" that are splined together for joint rotation. An outer end of the shaft 10 carries a coupling member or nut 3 having a seat 4 into which can fit a gear 7 carried on the end of a shaft 6 rotatable on the door 18 about the axis A. A spring 11 urges the nut 4 and outer shaft part 10" toward the gear 7 to engage the nut 4 over the gear 7 and thereby rotationally couple the shafts 6 and 10 together. This spring 11 also has a torque function in that it is seated in the fixed bearing 14 and in the nut 4 so as to urge the handle 1 into the rest position shown in FIG. 1.

The end of the shaft 6 opposite the gear 7 is connected via a swivel joint 19 with a crank arm 5 whose outer end is connected as shown in FIG. 4 by a link 8 to the latch release lever 2. Otherwise the crank arm 5 is also mounted in a journal 14 on the base plate 13. Thus rotation of the shaft 10 will normally rotate the shaft 6 which will pivot the crank 5 and also the lever 2, thereby opening the latch 17. The axial movability of the head or nut 3 and the spring 11 are provided so that during assembly the parts can be fitted together and so that they can compensate for out-of-tolerance mountings of the door latch 17 and handle 1, while the swivel 19 further allows misalignment of the axis of the plate 5 with the axis A of the shaft 10.

With this system if, for instance, the vehicle is involved in a side collision that pushes in the door 18 around the handle 1, this action will not necessarily cause the shaft 6 to rotate about its vertical axis A, thereby opening the door 18. Instead the damage will merely cause the entire mechanism to be deformed, and the likelihood of this deformation entailing any rotation of the shaft 6 is very, very small.

We claim:

1. In a motor-vehicle door, a latch assembly comprising:

a door latch having a release lever displaceable to unlatch the door;

a horizontally displaceable outside door handle;

a transmission member rotatable about an axis and connected to the handle such that horizontal displacement of the handle rotates the transmission member about the axis;

an actuating head rotationally fixed to the transmission member;

a shaft generally coaxial with the transmission member;

means including a formation on the shaft axially fittable with the actuating head for rotationally coupling the transmission member to the shaft;

a crank extending from the shaft and movable angularly about the axis on rotation of the shaft; and a link connected between the crank and the release lever, whereby when the handle is displaced horizontally the shaft is rotated about the axis, the crank and link are displaced and in turn displace the release lever, and the latch is operated.

2. The motor-vehicle door-latch assembly defined in claim 1 wherein the head is formed with a noncircular axially open seat and the formation is complementarily fittable in the seat.

3. The motor-vehicle door-latch assembly defined in claim 2 wherein the crank is an eccentric disk.

4. The motor-vehicle door-latch assembly defined in claim 2, further comprising a swivel joint between the shaft and the crank.

5. The motor-vehicle door-latch assembly defined in claim 2, further comprising a second shaft generally coaxial with the first-mentioned shaft and extending between and secured to the actuating head and the transmission member.

6. The motor-vehicle door-latch assembly defined in claim 5 wherein the second shaft has a pair of axially telescoping and rotationally coupled parts.

7. The motor-vehicle door-latch assembly defined in claim 6, further comprising a spring braced between the shaft parts and urging the head axially toward the formation.

8. The motor-vehicle door-latch assembly defined in claim 5 wherein the transmission member is an arm fixed on and extending radially from the second shaft, the assembly further comprising a counterweight mounted on the second shaft diametrally opposite the transmission member.

9. The motor-vehicle door-latch assembly defined in claim 8 wherein the transmission-member arm is formed as a fork and the handle has a coupling formation engaged in the fork.

* * * * *